June 28, 1960

B. J. BITTNER ET AL 2,943,275

TRANSFORMER FOR JOINING UNBALANCED TO BALANCED TRANSMISSION MEANS

Filed Sept. 9, 1957

INVENTORS:
Burt J. Bittner
Raymond H. Opperman
BY

Attorney

June 28, 1960
B. J. BITTNER ET AL
2,943,275
TRANSFORMER FOR JOINING UNBALANCED TO BALANCED TRANSMISSION MEANS
Filed Sept. 9, 1957
4 Sheets-Sheet 2
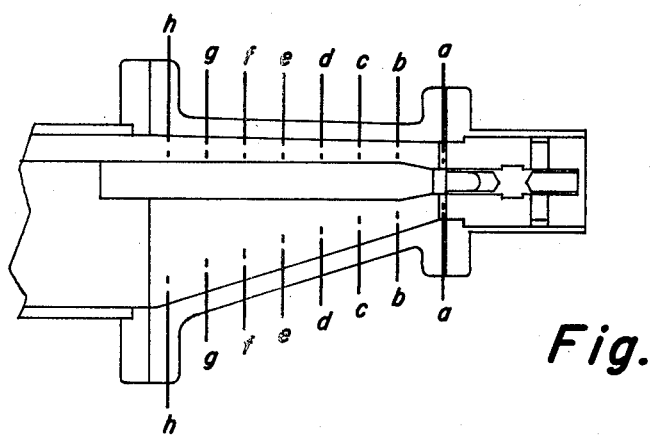
Fig. 3
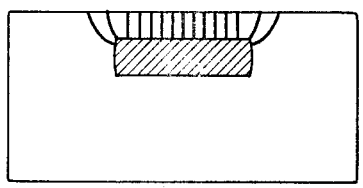 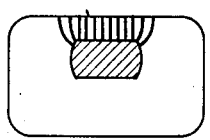 d
h
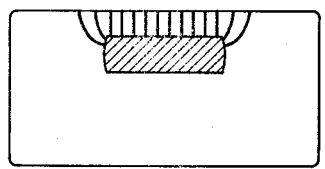 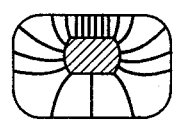 c
g
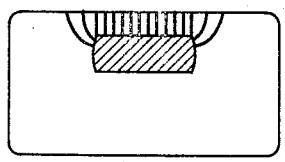  b
f
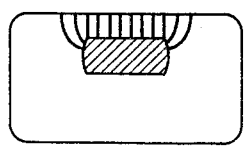  a
e
INVENTORS:
Burt J. Bittner
Raymond H. Opperman
BY
*Roland A. Anderson*
Attorney June 28, 1960

B. J. BITTNER ET AL 2,943,275

TRANSFORMER FOR JOINING UNBALANCED TO
BALANCED TRANSMISSION MEANS

Filed Sept. 9, 1957

INVENTORS:
Burt J. Bittner
Raymond H. Opperman
BY

Attorney

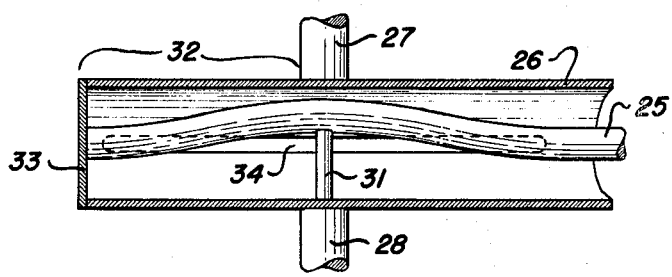
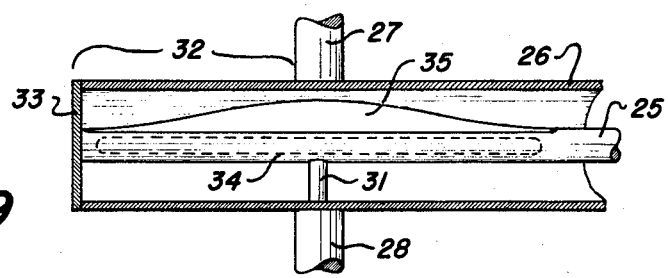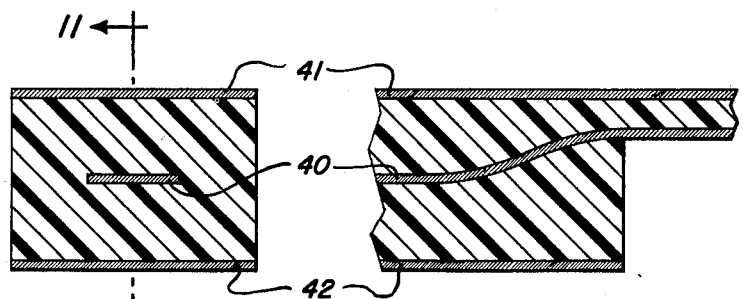

United States Patent Office 2,943,275
Patented June 28, 1960

---

2,943,275

TRANSFORMER FOR JOINING UNBALANCED TO BALANCED TRANSMISSION MEANS

Burt J. Bittner and Raymond H. Opperman, Albuquerque, N. Mex., assignors, by mesne assignments, to the United States of America as represented by the United States Atomic Energy Commission Filed Sept. 9, 1957, Ser. No. 682,992

6 Claims. (Cl. 333—26)

This invention relates generally to radio-frequency transmission means, and more particularly to a means for transforming from an unbalanced system to a balanced system.

In general, at the higher radio frequencies an unbalanced transmission means is characterized by an inner conductor centralized within an outer conductor system which is normally grounded. Perhaps the most common example of this type of transmission means is the coaxial cable. A balanced transmission means is balanced with respect to ground, i.e., the impedance measured to ground from any portion of the means is the same as that measured from any other portion. It follows that no part of a balanced transmission means is grounded. A familiar example of the balanced transmission means is the waveguide.

When an electromagnetic signal is transmitted by an unbalanced transmission means, it normally assumes the dominant TEM mode, in which both the electric and magnetic lines of force are perpendicular to the direction of transmission. Due to the influence of the centralized inner conductor, the electric and magnetic fields assume the coaxial form in which the lines of electric field intensity radiate from the inner conductor to the outer conductor system. The lines of magnetic field intensity, of course, are everywhere perpendicular to the electric field lines. (For simplicity, the electromagnetic signal will hereinafter be described only in terms of the lines of electric field intensity, although it will be understood that the magnetic field is always present also).

By contrast, an electromagnetic signal being transmitted by a balanced transmission means usually assumes a transverse electric (TE) mode, in which the electric lines of force extend transverse to the longitudinal axis of, and across the narrowest dimensions of any cross section of, the transmission means. This class of modes may be deignated $TE_{0,n}$ where "0" indicates the absence of electric field maxima along the narrow dimension of a cross section of the balanced transmission means, and "$n$" indicates any number of electric field maxima along the wide dimension. If the magnetic field also is perpendicular to the longitudinal axis, the mode may be designated as "transverse TEM" and will hereinafter be considered to be a type of TE mode.

It is quite frequently necessary to join an unbalanced transmission means to one that is balanced. For instance, it is not uncommon to transmit an electromagnetic signal by means of a coaxial cable to a balanced dipole antenna. Likewise, a coaxial cable and a waveguide are frequently joined. In such instances, there arises the necessity of converting the coaxial TEM mode to a TE mode, without creating excessive reflections of the signal within the transmission means. Numerous devices have been proposed in the prior art for achieving the transformation. However, most of these devices are more inefficient than is desirable, and many of them require a considerable length of transmission path in which to accomplish the transformation. It is not uncommon for a device of the prior art to operate with a Voltage Standing Wave Ratio (VSWR) of 1.5 or higher and to have a length greater than a wavelength of the transmitted signal. At least one embodiment of the present invention develops a VSWR of no more than 1.10 over a total bandwidth of 60% of the center frequency. Furthermore, the invention accomplishes the transformation in less than a quarter of a wavelength at the lowest frequency of the transmitted signal.

In brief, the present invention efficiently transforms the signal from the coaxial TEM mode to a TE mode by a smooth, increasing electrical decentralization of the inner conductor of the unbalanced transmission means until the signal, following the path of least impedance, is concentrated between the electrically closest portions of the inner conductor and the outer conductor system. At this point, the signal is no longer in the coaxial form. Instead, the electric lines of force are more nearly in the transverse form inasmuch as they extend substantially parallel to one another from the inner conductor to the facing portion of the outer conductor system. Once the transverse mode is established, a balanced transmission means can be connected at that point so as to efficiently receive the transmitted signal. The length of the transformer can be less than a quarter wavelength of the lowest-frequency signal transmitted.

The term "electrical decentralization" as used herein means causing the inner conductor of an unbalanced transmission means to appear to the signal as decentralized with respect to the outer conductor system. Electrical decentralization may or may not include actual physical decentralization.

The invention is more completely explained in the following detailed description, which should be read in conjunction with the attached drawings in which:

Fig. 3 is a series of skeletonized cross-sectional views of the transformer shown in Figs. 1 and 2, showing the effect of the transformer on the electric lines of force of an electromagnetic signal;

Fig. 8 is a longitudinal sectional view of another transformer for joining a coaxial line to a dipole antenna;

Fig. 9 is a longitudinal sectional view of still another transformer for joining a coaxial line to a dipole antenna;

Fig. 10 is a cross-sectional view of a transformer for joining an unbalanced strip line to a balanced strip line, taken at the unbalanced end; and Fig. 11 is a longitudinal sectional view of the transformer of Fig. 10, taken on line 11—11 in Fig. 10.

Figure 1:
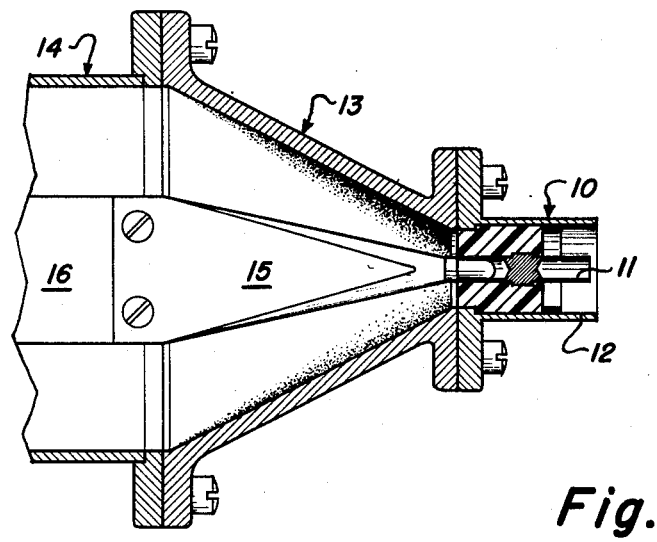
Fig. 1 shows a top sectional view of a transformer for joining a coaxial line to a ridge waveguide.
Figure 2:
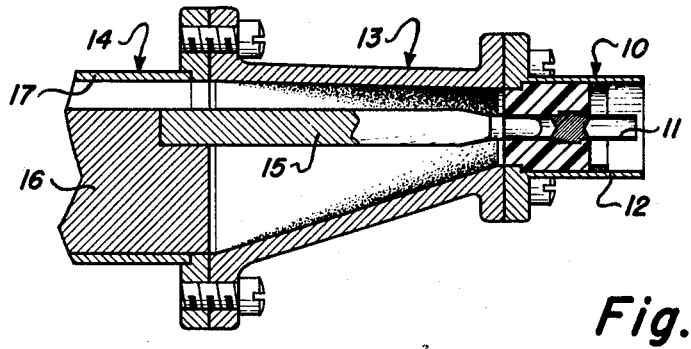
Fig. 2 shows a side sectional view of the transformer shown in Fig. 1.

Referring now to Figs. 1 and 2, which are plan and side sectional views, respectively, a transformer for joining a coaxial line to a ridge waveguide is seen. Coaxial connector 10 is conventional and includes centralized inner conductor 11 located concentrically within the outer conductor 12, whereby a coaxial line may be connected to transformer 13. Ridge waveguide 14 is joined to the transformer at its other end.

Inner conductor 15 is seen to join inner conductor 11 to ridge 16, being flush with the top of the ridge and maintaining spacing between itself and the top of the transformer equal to the spacing between ridge 16 and wall 17 of the waveguide. The remaining sides of the transformer increase their distance from inner conductor 15 with progression from coaxial connector 10 to waveguide 14. Although transformer 13 is roughly rectangular in cross section, it has been found expedient to provide a fillet at each inside corner of the transformer to increase the efficiency of transmission. For the same reason, the sides of inner conductor 15 are rounded and make a smooth transition to its flat upper and lower surfaces.

In order to show the effect of the transformer on an electromagnetic signal, Fig. 2 has been partially reshown as Fig. 3 and skeletonized cross-sectional views *a* through *h* have been taken along its length at points *a—a*, *b—b*, etc. In the cross-sectional views the lines of electric field intensity have been shown as determined by the field mapping of an actual model of the device, ignoring small fringe fields of comparatively minor importance and effect.

Diagram *a* shows the typical coaxial form of the TEM mode of transmission found in an unbalanced transmission means. The view is taken at the beginning of transformer 13 where it is a continuation of coaxial connector 10. The electric lines of force are seen to be radial from the inner conductor to the outer conductor system, and equally spaced.

At diagram *b*, the inner conductor is slightly flattened at its top and bottom and the outer conductor system is beginning to assume a rectangular cross section. The spacing between the conductors is seen to be at least at the top. The electric lines have lost their equal spacing and are now more concentrated in the upper and lower spacings of the transformer.

At the cross section shown by diagram *c*, the spacing between the inner conductor and the outer conductor system has increased on the bottom and the two sides, but remains constant at the top. The electric field is beginning to show a preference for the shorter spacing at the top, since that is the area of least impedance. The lines are seen to be considerably more crowded in that area than in the remaining areas.

The cross-sectional view of diagram *d* shows further flattening of the inner conductor and increased spacing between it and the outer conductor system, except at the top, where the spacing still remains constant. The electric field is seen to exist only between the top of the inner conductor and the facing portion of the outer conductor system. This condition remains throughout the remaining diagrams *e*, *f*, *g* and *h*.

It is seen from Fig. 3 that the transformer very effectively transforms the coaxial TEM mode into the transverse TE mode. The electromagnetic signal which enters the transformer by means of coaxial connector 10 is converted through a very short portion of the transmission path into a form which is supported naturally by ridge waveguide 14. The ridge waveguide may or may not be used as the conducting means of transmission beyond that shown in the figures. If it is desired to use a standard rectangular waveguide, it is suggested that ridge waveguide 14 be of the variety in which the height of the ridge above the bottom wall of the waveguide gradually tapers down and disappears, leaving a standard waveguide.

The form of the invention shown in Figs. 1, 2 and 3 affords a transition between the coaxial line and the ridge waveguide without change in characteristic impedance. This is accomplished by the broadening of inner conductor 15. The exact contour of the broadening may be determined by a field-mapping procedure which is well known in the art. Of course, if an impedance transformation is desired, the broadening of inner conductor 15 would not be as shown, but could be determined by field mapping.

Figure 4:
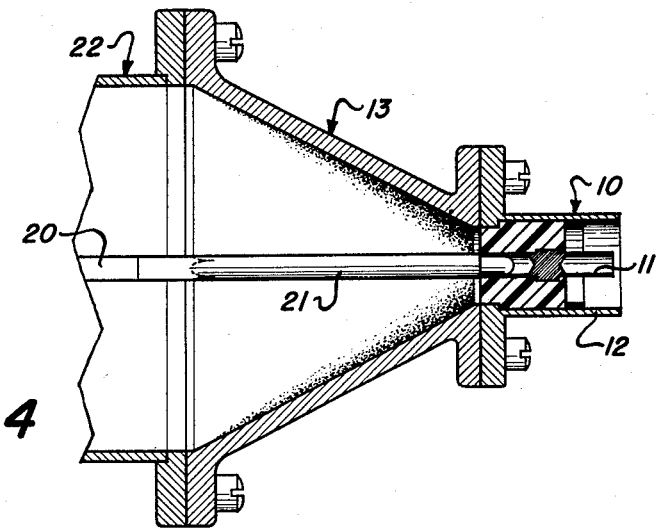
Fig. 4 is a top sectional view of a transformer for joining a coaxial line to a fin waveguide.

In the plan view of Fig. 4, a fin waveguide 22, which is a variation of the common ridge waveguide, is shown. Fin 20 is seen to be the same width as the diameter of inner conductor 11. Thus, there is no necessity for a change in diameter of inner conductor 21 along its length. Otherwise, construction and operation of the device are similar to that shown in Figs. 1, 2 and 3.

Figure 5:
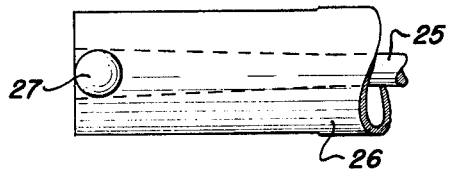
Figs. 5, 6 and 7 are views of a constant-impedance transformer for joining a coaxial line to a dipole antenna.
Figure 6:
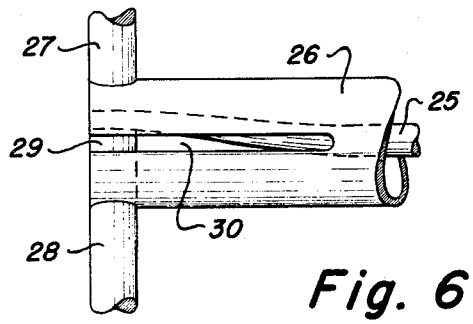
Figure 7:
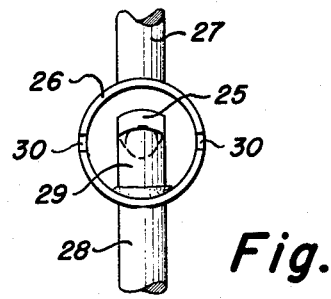

Another form of the invention, used when it is necessary to attach a coaxial line to a dipole antenna, is shown in Figs. 5, 6 and 7. Inner conductor 25 is seen to be concentric with outer conductor 26 where the coaxial line is attached. Within the transformer, inner conductor 25 smoothly becomes more and more eccentric with respect to the outer conductor until, at the point of connection with the dipole antenna, it is substantially closer to the top portion of the outer conductor than to the remainder thereof. At this point, upper pole 27 of the antenna is attached to outer conductor 26. Lower pole 28 is attached to the outer conductor diametrically opposite to the upper pole, and extends through the outer conductor to make contact with the lower surface of inner conductor 25. Portion 29 of the lower pole therefore acts as a shorting bar between the lower surface of inner conductor 25 and the facing portion of outer conductor 26. The shorting bar will not have a detrimental effect on the transmitted signal, because the signal is concentrated between the upper portion of conductor 25 and the facing portion of outer conductor 26.

However, there is a tendency for the outer surface of outer conductor 26 to conduct the electromagnetic signal between the upper and lower poles of the antenna. In order to eliminate this effect, slot 30, whose length is one quarter of the wavelength of the transmitted signal, is cut through each side of the outer conductor as shown. This slot presents a high impedance to the transmitted signal, preventing its being short circuited by the outer conductor.

It will be noted that inner conductor 25 is shown as being broadened and flattened as it approaches the antenna. This is similar to the broadening and flattening of inner conductor 15 shown in Figs. 1 and 2 and explained in connection therewith. If desired, inner conductor 25 may make connection with the lower pole without changing its circular cross section. In that event there would be a change in characteristic impedance coincident with the mode transformation.

A more efficient form of the transformer which may be used in joining a coaxial line to a dipole antenna is shown in Fig. 8. Proceeding in the direction of the transmitted signal (right to left), the transformer is seen to be quite similar to that shown in the preceding three figures up to the point where center conductor 25 is joined with lower pole 28 by means of shorting bar 31, which in this case is shown as having a smaller diameter than the lower pole. The embodiment of Fig. 8 also differs in that the center conductor is shown as maintaining its circular cross section throughout the transformation, although this is optional. If it is desired to maintain a constant characteristic impedance, the center conductor may be flattened and broadened as before described.

The embodiment of Fig. 8 derives its increased efficiency from the extension of the transformer for one quarter of the wavelength of the transmitted signal beyond the dipole antenna. The extended portion 32 is a mirror image of the first portion of the transformer, with center conductor 25 smoothly reattaining its concentric relationship within outer conductor 26. At the end of the extended portion, shorting conductor 33 furnishes an efficient short circuit between the inner and outer conductors and increases the mechanical rigidity by closing off the end of the outer conductor system and joining it to the inner conductor. Thus, the extended quarter-wave portion acts as a very high impedance, efficiently terminating the junction with the dipole antenna. A half-wave slot 34 is formed through the outer conductor at either side of the transformer, centered on the dipole, to prevent short circuiting of the electromagnetic signal by the outer conductor.

Another form of the invention, shown in Fig. 9, also utilizes the extended portion 32, which is a short-circuited quarter-wave section of transmission line, to furnish a high impedance termination for the transformer. However, in this embodiment inner conductor 25 extends straight through the transformer and has fastened to its top side a wedge-like fin 35, which smoothly approaches the upper inner surface of outer conductor 26 and then recedes therefrom as the extended portion of the transformer is entered. This fin may be either a conductor or a dielectric having a greater dielectric constant than that separating the inner and outer conductors. If the fin is conductive, the electromagnetic signal is forced to contain itself between the top portion of the fin and the facing portion of the outer conductor in the region of the antenna. The phsyical action is much the same as in the embodiment of Fig. 8. If the wedge is made of a dielectric, electrical decentralization of the center conductor will again occur, because the electromagnetic signal will find a path of lower impedance within the fin than it will outside it. This is because the impedance of the transformer is inversely proportional to the dielectric constant of the material. Hence the signal will follow the path of highest dielectric constant, in this case fin 35, and will avoid the portions of the transformer outside of the fin.

Another means for transmitting an electomagnetic signal is the strip line. Figs. 10 and 11 show a transformer for joining an unbalanced strip line to one that is balanced. At the unbalanced end of the transformer (shown in Fig. 10), inner conductor 40 is seen to be centralized between upper outer conductor 41 and lower outer conductor 42. A suitable solid dielectric separates the conductors and furnishes the support for the inner conductor. As seen in Fig. 11, electrical decentralization is accomplished by smooth physical displacement of the inner conductor until it is substantially closer to upper outer conductor 41 than it is to lower outer conductor 42.

An electromagnetic signal introduced to the unbalanced end of the transformer assumes a modified coaxial TEM mode with its electric lines of force radiating from the inner conductor to the outer conductors. As the signal proceeds through the transformer, the impedance between inner conductor 40 and lower outer conductor 42 increases with the spacing while the impedance between the inner conductor and upper outer conductor 41 decreases with their spacing until the signal is confined entirely to the space between the inner conductor and the upper outer conductor. From this point onward, the strip line may be continued in its balanced form, with inner conductor 40 now assuming the function of the lower outer conductor and upper outer conductor 41 continuing its function. It will be understood that a shorting bar could be connected from the lower surface of inner conductor 40 to the upper surface of lower outer conductor 42 at the point of termination of the latter, if desired. This shorting bar would slightly increase the efficiency of the transformer and would be similar to that shown in several of the previous figures.

An efficient transformer for joining unbalanced to balanced transmission means has been described. Generally, the dielectric separating the inner and outer conductors was shown for convenience as being a transparent gas. It will be understood however that the character of the dielectric is not limited to that shown, but may be dictated by the technical requirements of the specific application of the transformer. A number of specific embodiments of the invention have been shown and described, each of them operating on the principle of electrical decentralization of the inner conductor of the unbalanced transmission means, making possible a considerably shorter transformer than has existed heretofore. It will be understood that the invention is capable of assuming many different forms in addition to those shown herein, and it is contemplated that one skilled in the art will devise embodiments additional to those shown without departing from the sphere and scope of the invention as claimed below.

What is claimed is:

1. A transformer for joining an unbalanced transmission means to a balanced transmission means comprising an inner conductor and an outer conductor separated therefrom by a dielectric, said outer conductor surrounding the inner conductor throughout and coaxial therewith at one end, thereafter maintaining a fixed distance from one side of the inner conductor but increasing its distance from the remaining sides of the inner conductor as the other end is approached, means for connecting the coaxial end of the inner and outer conductors to the unbalanced transmission means and means for connecting the other end of the inner and outer conductors to the balanced transmission means.

2. A transformer for joining an unbalanced transmission means to a balanced transmission means comprising an inner conductor and an outer conductor separated therefrom by a dielectric, said outer conductor surrounding the inner conductor throughout and coaxial therewith at one end, thereafter maintaining a fixed distance from one side of the inner conductor but increasing its distance from the remaining sides of the inner conductor as the other end is approached, said outer conductor progressing smoothly from a circular cross section at the coaxial end to a substantially rectangular cross section at the other end, means for connecting the coaxial end of the inner and outer conductors to the unbalanced transmission means and means for connecting the other end of the inner and outer conductors to the balanced transmission means.

3. A transformer for joining a coaxial transmission line to a rectangular single ridge waveguide comprising an inner conductor and an outer conductor separated therefrom by a dielectric, said outer conductor surrounding the inner conductor throughout and coaxial therewith at one end, thereafter maintaining a fixed distance from one side of the inner conductor equal to the distance between the ridge top and the facing portion of the waveguide, but increasing its distance from the remaining sides of the inner conductor as the other end is approached, means for connecting the coaxial end of the inner and outer conductors to a corresponding pair of conductors of the coaxial transmission line, said inner and outer conductors being contiguous at said coaxial end with said corresponding transmission line conductors and having the same dimensions therewith, and means for connecting the other end of the inner and outer conductors to said ridge waveguide, the outer conductor being connected to the walls of the waveguide and the inner conductor being connected to the ridge, the inner conductor having the width of the ridge at its connection therewith, broadening thereto from the width of its corresponding coaxial transmission line conductor at the coaxial end.

4. A transformer for joining a coaxial transmission line to a rectangular single ridge waveguide comprising an inner conductor and an outer conductor separated therefrom by a dielectric, said outer conductor surrounding the inner conductor throughout and coaxial therewith at one end, thereafter maintaining a fixed distance from one side of the inner conductor equal to the distance between the ridge top and the facing portion of the waveguide, but increasing its distance from the remaining sides of the inner conductor as the other end is approached, said inner and outer conductors progressing smoothly from a circular cross section at the coaxial end to a substantially rectangular cross section at the other end, means for connecting the coaxial end of the inner and outer conductors to a corresponding pair of conductors of the coaxial transmission line, said inner and outer conductors being contiguous at said coaxial end with said corresponding transmission line conductors and having the same dimensions therewith, and means for connecting the other end of the inner and outer conductors to said ridge waveguide, the outer conductor being connected to the walls of the waveguide and the inner conductor being connected to the ridge, the inner conductor having the width of the ridge at its connection therewith, broadening thereto from the width of its corresponding coaxial transmission line conductor at the coaxial end.

5. A transformer for joining a coaxial transmission line to a fin waveguide comprising an inner conductor and an outer conductor separated therefrom by a dielectric, said outer conductor surrounding the inner conductor throughout and coaxial therewith at one end, thereafter maintaining a fixed distance from one side of the inner conductor equal to the distance between the fin top and the facing portion of the waveguide, but increasing its distance from the remaining sides of the inner conductor as the other end is approached, means for connecting the coaxial end of the inner and outer conductors to a corresponding pair of conductors of the coaxial transmission line, said inner and outer conductors being contiguous at said coaxial end with said corresponding transmission line conductors and having the same dimensions therewith, and means for connecting the other end of the inner and outer conductors to said fin waveguide, the outer conductor being connected to the walls of the waveguide and the inner conductor being connected to the fin top, the inner conductor having the width of the fin top at its connection therewith.

6. A transformer for joining a coaxial transmission line to a fin waveguide comprising an inner conductor and an outer conductor separated therefrom by a dielectric, said outer conductor surrounding the inner conductor throughout and coaxial therewith at one end, thereafter maintaining a fixed distance from one side of the inner conductor equal to the distance between the fin top and the facing portion of the waveguide, but increasing its distance from the remaining sides of the inner conductor as the other end is approached, said inner conductor having a substantially constant cross section, said outer conductor progressing smoothly from a circular cross section at the coaxial end to a substantially rectangular cross section at the other end, means for connecting the coaxial end of the inner and outer conductors to a corresponding pair of conductors at the coaxial transmission line, said inner and outer conductors being contiguous at said coaxial end with said corresponding transmission line conductors and having the same dimensions therewith, and means for connecting the other end of the inner and outer conductors to said fin waveguide, the outer conductor being connected to the outer portion of the waveguide and the inner conductor being connected to the fin top, the inner conductor having the width of the fin top at its connection therewith.

References Cited in the file of this patent

UNITED STATES PATENTS

| | | |
|---|---|---|
| 2,111,636 | Lindenblad | Mar. 22, 1938 |
| 2,260,529 | Lindenblad | Oct. 28, 1941 |
| 2,417,895 | Wheeler | Mar. 25, 1947 |
| 2,475,344 | Wheeler | July 5, 1949 |
| 2,812,501 | Sommers | Nov. 5, 1957 |
| 2,823,381 | Martin et al. | Feb. 11, 1958 |
| 2,886,786 | Peters et al. | May 12, 1959 |

FOREIGN PATENTS

| | | |
|---|---|---|
| 891,863 | Germany | Oct. 1, 1953 |

OTHER REFERENCES

Ragan: Microwave Transmission Circuits, McGraw Hill Book Co., New York, 1948. Pages 360 and 361 are relied on.